United States Patent
Bae et al.

(10) Patent No.: US 11,946,675 B2
(45) Date of Patent: Apr. 2, 2024

(54) VALVE DEVICE

(71) Applicant: SAMSUNG ELECTRONICS CO., LTD., Suwon-si (KR)

(72) Inventors: Jungwook Bae, Suwon-si (KR); Seulki Min, Suwon-si (KR); Kookjeong Seo, Suwon-si (KR); Wonjae Yoon, Suwon-si (KR); Heemoon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 271 days.

(21) Appl. No.: 17/536,578

(22) Filed: Nov. 29, 2021

(65) Prior Publication Data
US 2022/0163244 A1    May 26, 2022

Related U.S. Application Data

(63) Continuation of application No. PCT/KR2021/016396, filed on Nov. 11, 2021.

(30) Foreign Application Priority Data

Nov. 26, 2020    (KR) .................. 10-2020-0161604

(51) Int. Cl.
*F25B 41/20*      (2021.01)
*F16K 11/074*    (2006.01)
(Continued)

(52) U.S. Cl.
CPC .......... *F25B 41/20* (2021.01); *F16K 11/0743* (2013.01); *F25B 41/37* (2021.01); *F25D 21/04* (2013.01)

(58) Field of Classification Search
CPC ........ F25B 41/20; F25B 41/37; F25B 41/385; F25B 2400/0403; F25B 2600/2501;
(Continued)

(56) References Cited

U.S. PATENT DOCUMENTS

| 8,091,380 B2 | 1/2012 | Chen |
| 2007/0084238 A1* | 4/2007 | Son .................... F25B 5/00 62/527 |

(Continued)

FOREIGN PATENT DOCUMENTS

| CN | 110735948 A | 1/2020 |
| JP | 9-292164 A | 11/1997 |

(Continued)

OTHER PUBLICATIONS

International Search Report dated Mar. 4, 2022 in PCT Application No. PCT/KR2021/016396.

(Continued)

*Primary Examiner* — Emmanuel E Duke
(74) *Attorney, Agent, or Firm* — STAAS & HALSEY LLP

(57) ABSTRACT

A valve device comprises a case comprising an open lower portion and an accommodation space formed therein, a base plate to cover the open lower portion of the case, an inlet pipe connected to the base plate and through which a refrigerant is introduced to the accommodation space, a boss installed to the base plate and comprising a plurality of refrigerant inlet and outlet holes through which the introduced refrigerant from the accommodation space is introduced and discharged, a plurality of inlet and outlet pipes respectively connected to the plurality of refrigerant inlet and outlet holes, and through which the refrigerant is introduced from the boss or discharged to the boss, and a pad comprising an open cavity formed therein to selectively open one refrigerant inlet and outlet hole, and a connection cavity formed therein to selectively connect two refrigerant inlet and outlet holes.

19 Claims, 17 Drawing Sheets

(51) Int. Cl.
*F25B 41/37* (2021.01)
*F25D 21/04* (2006.01)

(58) Field of Classification Search
CPC ............. F25B 2600/2507; F25B 47/00; F25B 47/006; F16K 11/0743; F16K 11/10; F16K 3/314; F16K 15/00; F16K 31/041; F25D 21/04
See application file for complete search history.

(56) References Cited

U.S. PATENT DOCUMENTS

| | | | |
|---|---|---|---|
| 2014/0190192 | A1 | 7/2014 | Bassmann |
| 2020/0173575 | A1* | 6/2020 | Yokoe .................. F16K 31/535 |

FOREIGN PATENT DOCUMENTS

| | | | | |
|---|---|---|---|---|
| JP | 2012-37224 | A | 2/2012 | |
| JP | 2014-211181 | | 11/2014 | |
| JP | 5802350 | | 10/2015 | |
| JP | 2015-218894 | A | 12/2015 | |
| JP | 2016080077 | | 5/2016 | |
| JP | 2016-205476 | | 12/2016 | |
| JP | 6306758 | | 4/2018 | |
| KR | 20-1996-0003318 | U | 1/1996 | |
| KR | 10-0915881 | | 9/2009 | |
| KR | 10-2011-0023544 | A | 3/2011 | |
| KR | 10-1394329 | B1 | 5/2014 | |
| KR | 10-1622727 | B1 | 5/2016 | |
| KR | 101622727 | B1 * | 5/2016 | ............... F16K 3/06 |
| KR | 10-1814206 | B1 | 1/2018 | |
| KR | 10-1849959 | | 4/2018 | |
| KR | 10-1853696 | B1 | 5/2018 | |

OTHER PUBLICATIONS

European Search Report dated Nov. 23, 2023 issued in European Application No. EP 21 89 8444.

* cited by examiner

VALVE DEVICE

CROSS-REFERENCE TO RELATED APPLICATIONS

This application is a continuation application, under 35 U.S.C. § 111(a), of International Patent Application No. PCT/KR2021/016396, filed on Nov. 11, 2021, which claims the priority benefit of Korean Patent Application No. 10-2020-0161604, filed on Nov. 26, 2020 in the Korean Patent and Trademark Office, the disclosures of which are hereby incorporated by reference in their entirety.

BACKGROUND

1. Field

The present disclosure relates to a valve device including an improved structure.

2. Description of Related Art

In general, in a cooling device to which a refrigeration cycle is applied, a refrigerant is circulated through a compressor, a condenser, an expansion device, and an evaporator to generate cold air.

A refrigerant compressed in the compressor is transferred to the condenser through a refrigerant pipe and then condensed, and the refrigerant condensed in the condenser is transferred to the expansion device and expanded. The refrigerant expanded in the expansion device is transferred to the evaporator, and may generate cold air through heat exchange in the evaporator.

In the case of a refrigerator, the refrigerant condensed in the condenser is transferred to the expansion device through the refrigerant pipe, and particularly, the refrigerant condensed in the condenser is directly transferred to the expansion device or is transferred to the expansion device by passing through a hot pipe through a branch pipe branched from the refrigerant pipe.

The hot pipe is a pipe installed to prevent formation of dew on a gasket portion of a refrigerator door, which is a temperature-vulnerable portion of the refrigerator. That is, a high-temperature refrigerant in a high-pressure portion of the refrigeration cycle passes through the hot pipe to prevent formation of dew on the gasket portion of the refrigerator door. The hot pipe only needs to maintain a temperature greater than or equal to a dew point according to humidity of the outside air, but when the temperature is maintained to be greater than or equal to the dew point in the refrigerator, it acts as a heat load inside the refrigerator, thereby increasing the power consumption of the refrigerator.

Therefore, according to operation conditions, the refrigerant condensed in the condenser is transferred to the expansion device through the hot pipe or directly transferred to the expansion device without passing through the hot pipe. When there is no need to transfer the refrigerant to the hot pipe, energy efficiency may be increased by preventing the refrigerant from being transferred to the branch pipe connected to the hot pipe. For this, a three-way valve is installed at a portion branched from the refrigerant pipe to the branch pipe.

However, a portion of the refrigerant, which is transferred directly to the expansion device by the three-way valve without passing through the hot pipe, is introduced into the branch pipe at the junction of the branch pipe and the refrigerant pipe, and then transferred to the hot pipe. That is, at the junction of the branch pipe and the refrigerant pipe, a portion of the refrigerant flows back into the hot pipe. In order to prevent this, a check valve may be installed between the hot pipe and the junction of the branch pipe and the refrigerant pipe, or a three-way valve may be additionally installed at the junction of the branch pipe and the refrigerant pipe, which may cause an additional cost. Further, it is difficult for the check valve to completely prevent the backflow, and thus the check valve may be less effective. In addition, when the three-way valve is additionally installed, a difficulty, such as securing an installation space of the three-way valve, and a complicated pipe connection may occur.

In addition, a capillary tube, which is an expansion device, may be provided with a plurality of different inner diameters and different lengths in order to respond to a cooling load that varies according to an external temperature, a set temperature, an input load, and the like. In this case, it is required to control the refrigerant to flow into an appropriate capillary tube among a plurality of capillary tubes according to the cooling load.

SUMMARY

The present disclosure is directed to providing a valve device including an improved structure configured to, when a refrigerant, which is condensed in a condenser, is directly transferred to an expansion device without passing through a hot pipe, prevent the refrigerant from flowing back to the hot pipe.

Further, the present disclosure is directed to providing a valve device capable of being improved to allow a refrigerant, which is condensed in a condenser, to flow to an appropriate capillary tube among a plurality of capillary tubes according to a cooling load.

One aspect of the present disclosure provides a valve device including a case including an open lower portion and an accommodation space provided therein, a base plate to cover the open lower portion of the case, an inlet pipe connected to the base plate and through which a refrigerant is introduced into the accommodation space, a boss installed to the base plate and including a plurality of refrigerant inlet and outlet holes through which the introduced refrigerant from the accommodation space is introduced and discharged, a plurality of inlet and outlet pipes respectively connected to the plurality of refrigerant inlet and outlet holes, and through which the refrigerant is introduced from the boss or discharged to the boss, and a pad including an open cavity provided to selectively open one refrigerant inlet and outlet hole among the plurality of refrigerant inlet and outlet holes, and a connection cavity formed therein to selectively connect two refrigerant inlet and outlet holes among the plurality of refrigerant inlet and outlet holes. The open cavity includes a first region formed on one side of the open cavity and a second region formed on an other side of the open cavity and provided at a position rotated 45 degrees clockwise from the first region with respect to a center of the pad.

The open cavity may selectively open one refrigerant inlet and outlet hole among the plurality of refrigerant inlet and outlet holes according to a rotation of the pad, and in response to the pad being rotated 45 degrees or less when the one refrigerant inlet and outlet hole is opened, the open state of the one refrigerant inlet and outlet hole may be maintained.

The open cavity and the connection cavity may be formed in a shape of a groove which is recessed from a bottom surface of the pad.

The open cavity may extend to an edge of the pad in a radial direction of the pad, and the open cavity may have a size of 75 degrees to 80 degrees with respect to the center of the pad in a circumferential direction of the pad.

The connection cavity may selectively connect two refrigerant inlet and outlet holes adjacent to each other among the plurality of refrigerant inlet and outlet holes.

The plurality of refrigerant inlet and outlet holes may include a first refrigerant inlet and outlet hole, a second refrigerant inlet and outlet hole formed at a position rotated 90 degrees clockwise from the first refrigerant inlet and outlet hole with respect to a center of the boss, a third refrigerant inlet and outlet hole formed at a position rotated 90 degrees clockwise from the second refrigerant inlet and outlet hole with respect to the center of the boss, and a fourth refrigerant inlet and outlet hole formed at a position rotated 90 degrees clockwise from the third refrigerant inlet and outlet hole with respect to the center of the boss.

The plurality of inlet and outlet pipes may include a first inlet and outlet pipe connected to the first refrigerant inlet and outlet hole, a second inlet and outlet pipe connected to the second refrigerant inlet and outlet hole, a third inlet and outlet pipe connected to the third refrigerant inlet and outlet hole, and a fourth inlet and outlet pipe connected to the fourth refrigerant inlet and outlet hole.

The inlet pipe may be connected to an outlet pipe of a condenser to receive a refrigerant from the condenser therethrough, the first inlet and outlet pipe and the third inlet and outlet pipe may be connected to a hot pipe, the fourth inlet and outlet pipe may be connected to a first capillary tube, and the second inlet and outlet pipe may be connected to a second capillary tube.

In response to the second region of the open cavity being located in the first refrigerant inlet and outlet hole, the valve device is in a closed state so that only the first refrigerant inlet and outlet hole may be opened by the open cavity while the second refrigerant inlet and outlet hole, the third refrigerant inlet and outlet hole, and the fourth refrigerant inlet and outlet hole are closed, and the refrigerant from the accommodation space may be discharged to the first inlet and outlet pipe through the first refrigerant inlet and outlet hole and then introduced into the hot pipe.

In response to the first region of the open cavity being located in the first refrigerant inlet and outlet hole as the pad is rotated 45 degrees clockwise with respect to the center of the boss, the first refrigerant inlet and outlet hole may be opened, the second refrigerant inlet and outlet hole may be closed, and the third refrigerant inlet and outlet hole and the fourth refrigerant inlet and outlet hole may be connected by the connection cavity.

The refrigerant from the accommodation space may be discharged to the first inlet and outlet pipe through the first refrigerant inlet and outlet hole, introduced into the third inlet and outlet pipe through the hot pipe, discharged to the fourth inlet and outlet pipe through the fourth refrigerant inlet and outlet hole connected to the third refrigerant inlet and outlet hole by the connection cavity, and then introduced into the first capillary tube.

In response to the second region of the open cavity being located in the second refrigerant inlet and outlet hole as the pad is rotated 90 degrees clockwise with respect to the center of the boss, the second refrigerant inlet and outlet hole may be opened, and thus the refrigerant from the accommodation space may be discharged to the second inlet and outlet pipe through the second refrigerant inlet and outlet hole, and introduced into the second capillary tube, and the first refrigerant inlet and outlet hole and the third refrigerant inlet and outlet hole may be closed to prevent the refrigerant being discharged to the first inlet and outlet pipe and the third inlet and outlet pipe.

In response to the first region of the open cavity being located in the third refrigerant inlet and outlet hole as the pad is rotated 225 degrees clockwise with respect to the center of the boss, the third refrigerant inlet and outlet hole may be opened, the fourth refrigerant inlet and outlet hole may be closed, and the first refrigerant inlet and outlet hole and the second refrigerant inlet and outlet hole may be connected by the connection cavity.

The refrigerant from the accommodation space may be discharged to the third inlet and outlet pipe through the third refrigerant inlet and outlet hole, introduced into the first inlet and outlet pipe through the hot pipe, and may be discharged to the second inlet and outlet pipe through the second refrigerant inlet and outlet hole connected to the first refrigerant inlet and outlet hole by the connection cavity, and then introduced into the second capillary tube.

In response to the second region of the open cavity being located in the fourth refrigerant inlet and outlet hole as the pad is rotated 270 degrees clockwise with respect to the center of the boss, the fourth refrigerant inlet and outlet hole may be opened, and thus the refrigerant from the accommodation space may be discharged to the fourth inlet and outlet pipe through the fourth refrigerant inlet and outlet hole, and introduced into the first capillary tube, and the first refrigerant inlet and outlet hole and the third refrigerant inlet and outlet hole may be closed to prevent the refrigerant from being discharged to the first inlet and outlet pipe and the third inlet and outlet pipe.

A valve device comprises a main body having an open bottom portion and an accommodation space formed therein, a base plate to cover the open bottom portion, an inlet pipe connected to the base plate and through which a refrigerant is introduced into the accommodation space, a boss installed to the base plate and comprising a plurality of holes, a plurality of pipes respectively connected to the plurality of holes, and a pad provided inside of the main body and to rotate with respect to the boss to selectively open or close the plurality of holes to control a flow of the refrigerant from the accommodation space to the plurality of pipes.

The pad has a first recessed portion recessed from a bottom surface of the pad and from an outer surface of the pad thereby forming an open cavity, and a second recessed portion recessed from the bottom surface of the pad thereby forming a connection cavity to connect two of the plurality of holes to communicate each other.

The first recessed portion includes a first area and a second area, and one of the first area and the second area is to be aligned with one of the plurality of holes to selectively open the aligned one of the plurality of holes while selectively closing other plurality of hole or connecting two of other plurality of holes via the connection cavity.

In response to the two of other plurality of holes are connected via the connection cavity, the refrigerant from the accommodation space flows through the aligned hole, a hot pipe, the connection cavity, and one of a first capillary tube or a second capillary tube.

In response to the two of other plurality of holes are connected via the connection cavity, the refrigerant from the accommodation space flows through the aligned hole and one of the first or second capillary tube by bypassing the hot pipe.

It is possible to prevent backflow of a refrigerant by using a single valve device without additionally installing a check valve or other valve device, and thus there is no need to secure a space for additionally installing the valve device and it is possible to minimize additional increase in cost.

Further, according to the cooling load, it is possible to allow a refrigerant to flow an appropriate capillary tube among a plurality of capillary tubes having different inner diameters and lengths, and thus it is possible to efficiently operate various cooling load regions.

BRIEF DESCRIPTION OF THE DRAWINGS

The above and other aspects, features and advantages of the disclosure will become more apparent from the following description of example embodiments with reference to the accompanying drawings, in which.

DETAILED DESCRIPTION

Figure 1:
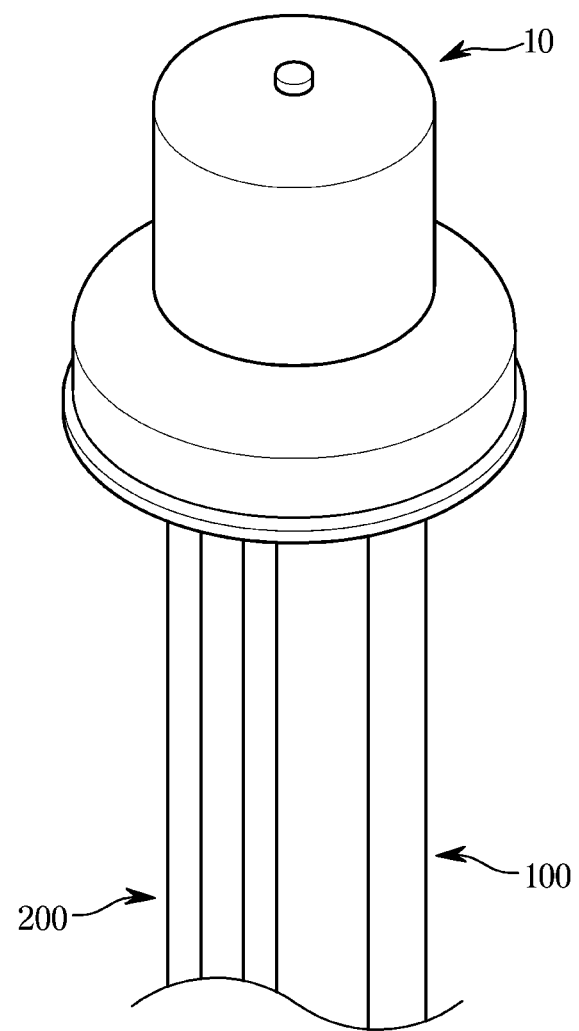
FIG. 1 is a perspective view of a valve device according to one embodiment of the present disclosure.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

Hereinafter embodiments of the disclosure will be described with reference to drawings. In the following detailed description, the terms of "front end", "rear end", "upper portion", "lower portion", "upper end", "lower end" and the like may be defined by the drawings, but the shape and the location of the component is not limited by the term.

Hereinafter, exemplary embodiments of the present disclosure will be described in detail with reference to the accompanying drawings.

Figure 2:
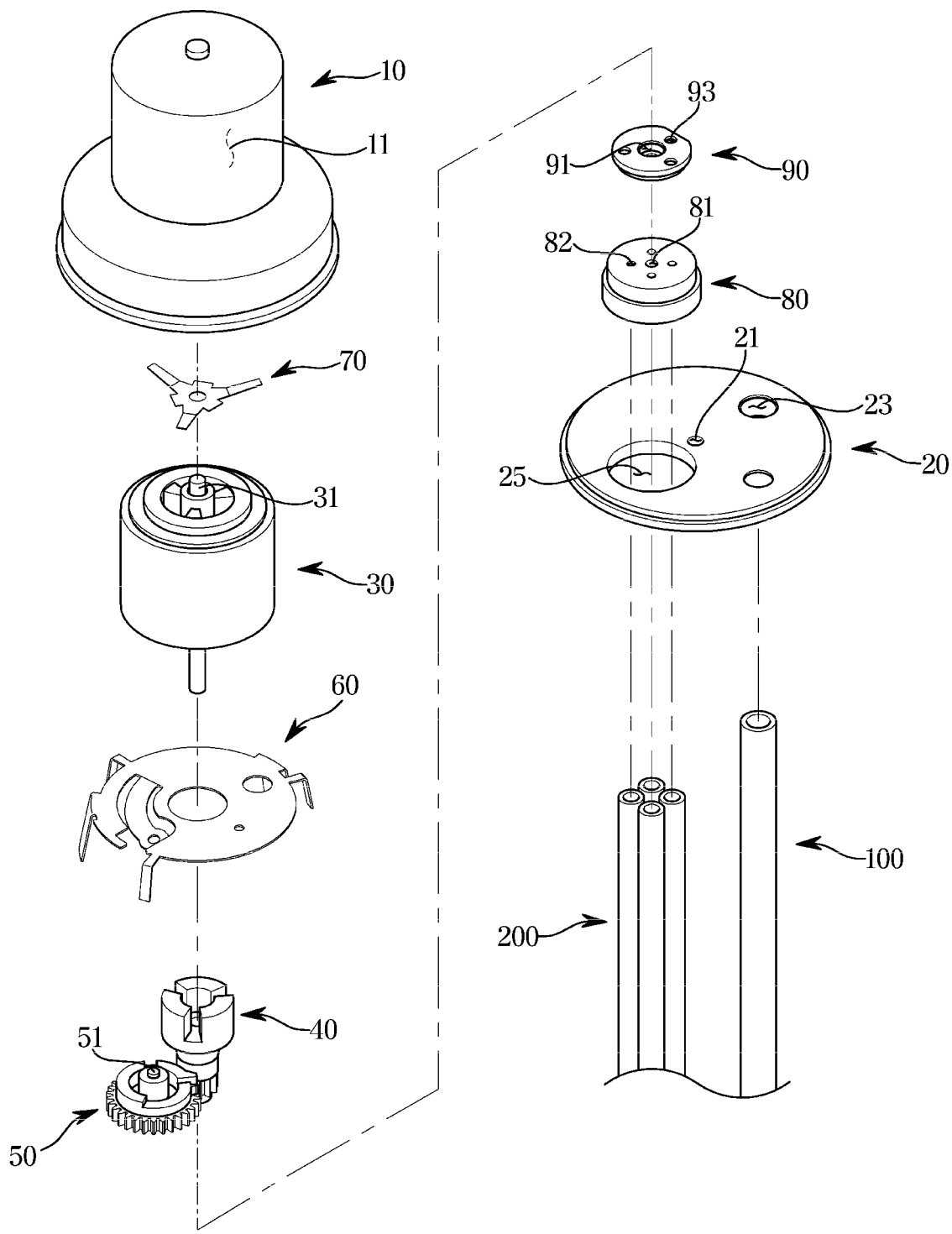
FIG. 2 is an exploded perspective view of the valve device according to one embodiment of the present disclosure.
Figure 3:
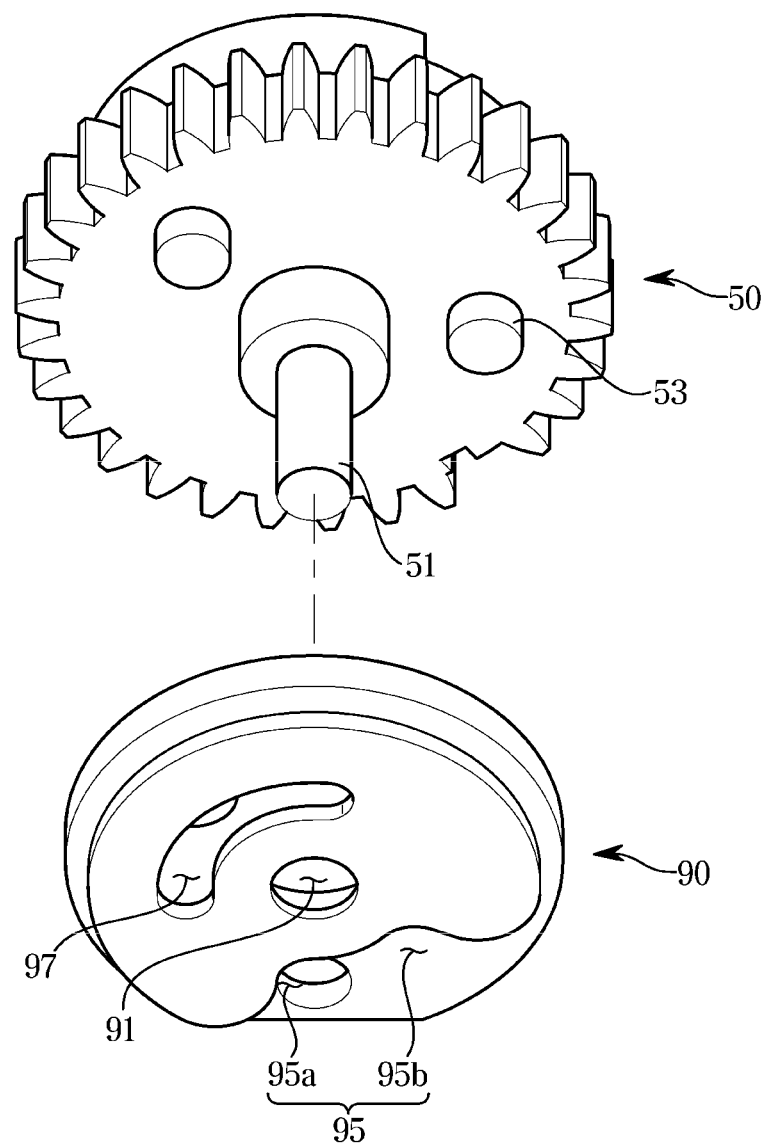
FIG. 3 is a view illustrating a state in which a pad gear is coupled to a pad according to one embodiment of the present disclosure.
Figure 4:
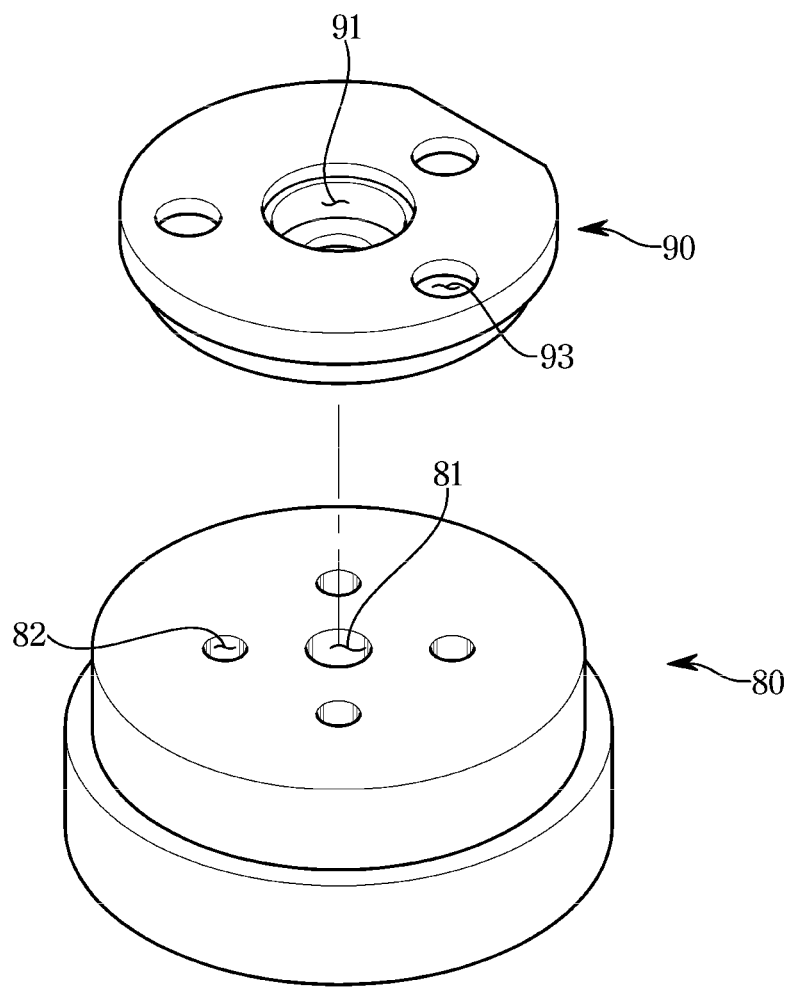
FIG. 4 is a view illustrating a state in which the pad is arranged in an upper side of a boss according to one embodiment of the present disclosure.
Figure 5:
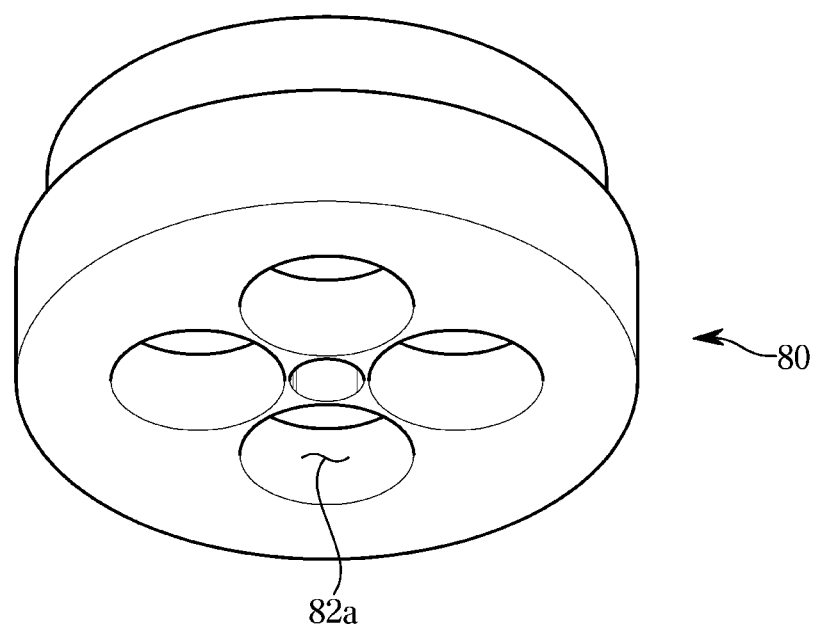
FIG. 5 is a view illustrating a lower surface of the boss according to one embodiment of the present disclosure.
Figure 6:
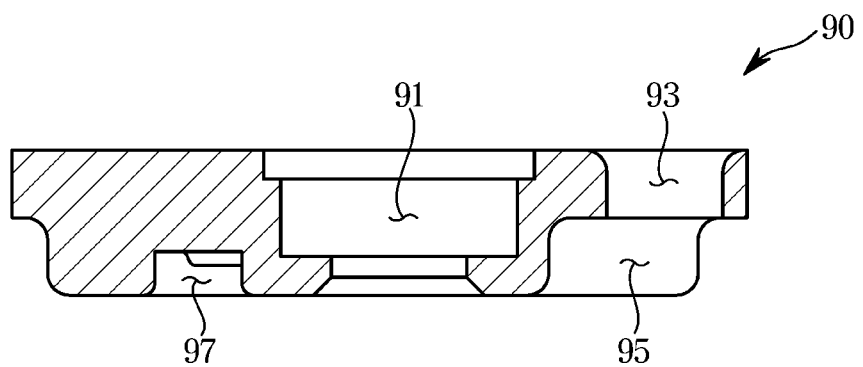
FIG. 6 is a side cross-sectional view of the pad according to one embodiment of the present disclosure.
Figure 7:
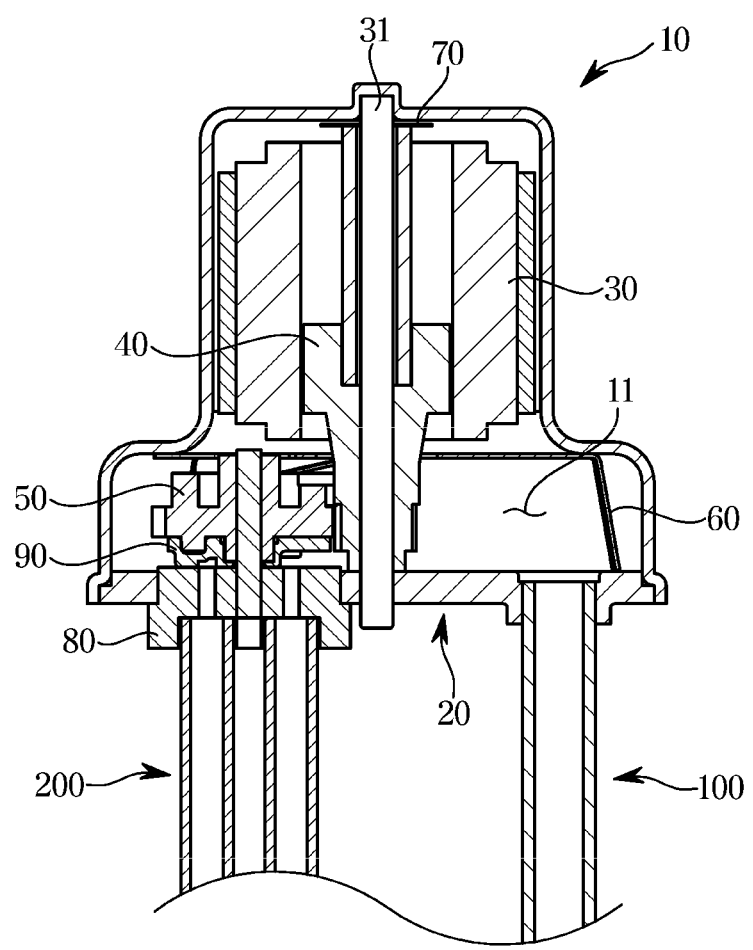
FIG. 7 is a side cross-sectional view of the valve device according to one embodiment of the present disclosure.

FIG. 1 is a perspective view of a valve device according to one embodiment of the present disclosure. FIG. 2 is an exploded perspective view of the valve device according to one embodiment of the present disclosure. FIG. 3 is a view illustrating a state in which a pad gear is coupled to a pad according to one embodiment of the present disclosure. FIG. 4 is a view illustrating a state in which the pad is arranged in an upper side of a boss according to one embodiment of the present disclosure. FIG. 5 is a view illustrating a lower surface of the boss according to one embodiment of the present disclosure. FIG. 6 is a side cross-sectional view of the pad according to one embodiment of the present disclosure. FIG. 7 is a side cross-sectional view of the valve device according to one embodiment of the present disclosure.

As illustrated in FIGS. 1 to 7, a valve device may include a case 10, a base plate 20 provided to cover an open lower portion of the case 10, an inlet pipe 100 to which a refrigerant is introduced, a plurality of inlet and outlet pipes 200 through which a refrigerant is introduced and discharged, a boss 80 including a plurality of refrigerant inlet and outlet holes 82 through which a refrigerant is introduced and discharged, and a pad 90 rotatably arranged in an upper side of the boss 80.

The case 10 may be provided such that a lower portion thereof is opened, and an accommodation space 11 is formed therein.

A rotor 30 may be provided in the accommodation space 11 inside the case 10. The rotor 30 may include a rotor shaft 31.

In addition, a pinion gear 40 may be provided in the accommodation space 11. The pinion gear 40 may be connected to the rotor 30. The pinion gear 40 may be connected to the rotor shaft 31 so as to be rotatable together with the rotor 30.

Further, a pad gear 50 may be arranged in the accommodation space 11. The pad gear 50 may be arranged on a lateral side of the pinion gear 40. The pad gear 50 may be engaged with the pinion gear 40 so as to be interlocked with the pinion gear 40. Therefore, in response to the rotation of the pinion gear 40 by the rotor 30, the pad gear 50 may be rotated by the pinion gear 40. The pad gear 50 may include a pad valve shaft 51 that is a rotation shaft. The pad valve shaft 51 may be connected to the pad 90 to allow the pad 90 to be rotated together with the pad gear 50. The pad gear 50 may include a pad coupling protrusion 53 coupled to the pad 90. The pad coupling protrusion 53 may be provided in plural. The pad coupling protrusion 53 may be provided on a lower surface of the pad gear 50. The pad coupling protrusion 53 may be coupled to a pad gear coupling hole 93 formed on an upper surface of the pad 90.

Further, an elastic support spring 60 may be provided in the accommodation space 11. The elastic support spring 60 may be fixed to the case 10 in the accommodation space 11. The elastic support spring 60 may be formed in a plate shape. The elastic support spring 60 may elastically support an upper central portion of the pad gear 50. The pad gear 50 may be rotatably mounted to the elastic support spring 60.

Further, a rotor support plate spring 70 may be provided in the accommodation space 11. The rotor support plate spring 70 may be fixed to the case 10 in the accommodation space 11. The rotor support plate spring 70 may elastically support the rotor 30. The rotor 30 may be rotatably supported by the rotor support plate spring 70.

The base plate 20 may cover the open lower portion of the case 10. The base plate 20 may include a rotor shaft support hole 21 by which the rotor shaft 31 is rotatably supported. The base plate 20 may include a refrigerant inlet hole 23 to which the inlet pipe 100, to which the refrigerant is introduced, is connected. The base plate 20 may include a boss hole 25 in which the boss 80 is installed.

The boss 80 may be installed in the boss hole 25 of the base plate 20. An upper portion of the boss 80 may be arranged in the accommodation space 11. A lower portion of the boss 80 may be arranged outside the accommodation space 11. The boss 80 may include a pad valve shaft hole 81 into which the pad valve shaft 51 is rotatably inserted. The boss 80 may include a plurality of refrigerant inlet and outlet holes 82 through which the refrigerant is introduced or discharged. The plurality of refrigerant inlet and outlet holes 82 may be connected to the plurality of inlet and outlet pipes 200 through which the refrigerant is introduced or discharged. The plurality of refrigerant inlet and outlet holes 82 may be provided as four. The plurality of inlet and outlet pipes 200 connected to the plurality of refrigerant inlet and outlet holes 82 may be provided as four. The boss 80 may include a plurality of insertion holes 82a into which the plurality of inlet and outlet pipes 200 is inserted. The plurality of insertion holes 82a may be provided in four to correspond to the number of the plurality of inlet and outlet pipes 200. The plurality of insertion holes 82a may be connected to the plurality of refrigerant inlet and outlet holes 82.

The pad 90 may be rotatably arranged in the upper side of the boss 80. The pad 90 may include a pad valve shaft coupling hole 91 to which the pad valve shaft 51 is coupled. The pad 90 may include a pad gear coupling hole 93 to which the pad coupling protrusion 53 of the pad gear 50 is coupled. Accordingly, the pad 90 may be rotated together with the pad gear 50.

The pad 90 may include an open cavity 95 provided to selectively open one refrigerant inlet and outlet hole 82 among the plurality of refrigerant inlet and outlet holes 82 formed in the boss 80. The open cavity 95 may be formed in a lower portion of the pad 90. The open cavity 95 may be provided in a shape in which a groove is recessed upward on a lower surface of the pad 90. The open cavity 95 may be provided to extend to an edge of the pad 90 in a radial direction of the pad 90. The open cavity 95 may have a size of 75 degrees to 80 degrees with respect to the center of the pad 90 in a circumferential direction of the pad 90. The open cavity 95 may include a first region 95a formed on one side of the open cavity 95, and a second region 95b formed on the other side of the open cavity 95. (Refer to FIG. 8) The first region 95a may be a portion adjacent to a left end when the pad 90 is viewed from the top. The second region 95b may be a portion adjacent to a right end when the pad 90 is viewed from the top. The second region 95b may be formed in a position rotated 45 degrees from the first region 95a with respect to the center of the pad 90. The open cavity 95 may have a size that allows the first region 95a or the second region 95b to selectively open one refrigerant inlet and outlet hole 82 among the plurality of refrigerant inlet and outlet holes 82. The open cavity 95 may have a size that prevents two refrigerant inlet and outlet holes from being opened simultaneously among the plurality of refrigerant inlet and outlet holes 82. That is, one of the refrigerant inlet and outlet holes 82 may be located in the first region 95a and then opened or one of the refrigerant inlet and outlet holes 82 may be located in the second region 95b and then opened. The pad 90 may be rotated together with the pad gear 50 to selectively open one refrigerant inlet and outlet hole 82 of the refrigerant inlet and outlet holes 82 formed in the boss 80.

The pad 90 may include a connection cavity 97 provided to selectively connect two refrigerant inlet and outlet holes 82 among the plurality of refrigerant inlet and outlet holes 82 formed in the boss 80. The connection cavity 97 may be formed in the lower portion of the pad 90. The connection cavity 97 may be provided in the shape in which a groove is recessed upward on the lower surface of the pad 90. The connection cavity 97 may connect two refrigerant inlet and outlet holes 82 adjacent to each other among the plurality of refrigerant inlet and outlet holes 82.

The valve device may further include a stator (not shown). The stator may be provided to surround a portion, in which the rotor 30 is arranged, from the outside of the case 10.

The valve device may further include a bracket (not shown). The bracket may allow the case 10 and the stator to be coupled to each other. The bracket may allow the valve device to be fixed to an external device.

Figure 8:
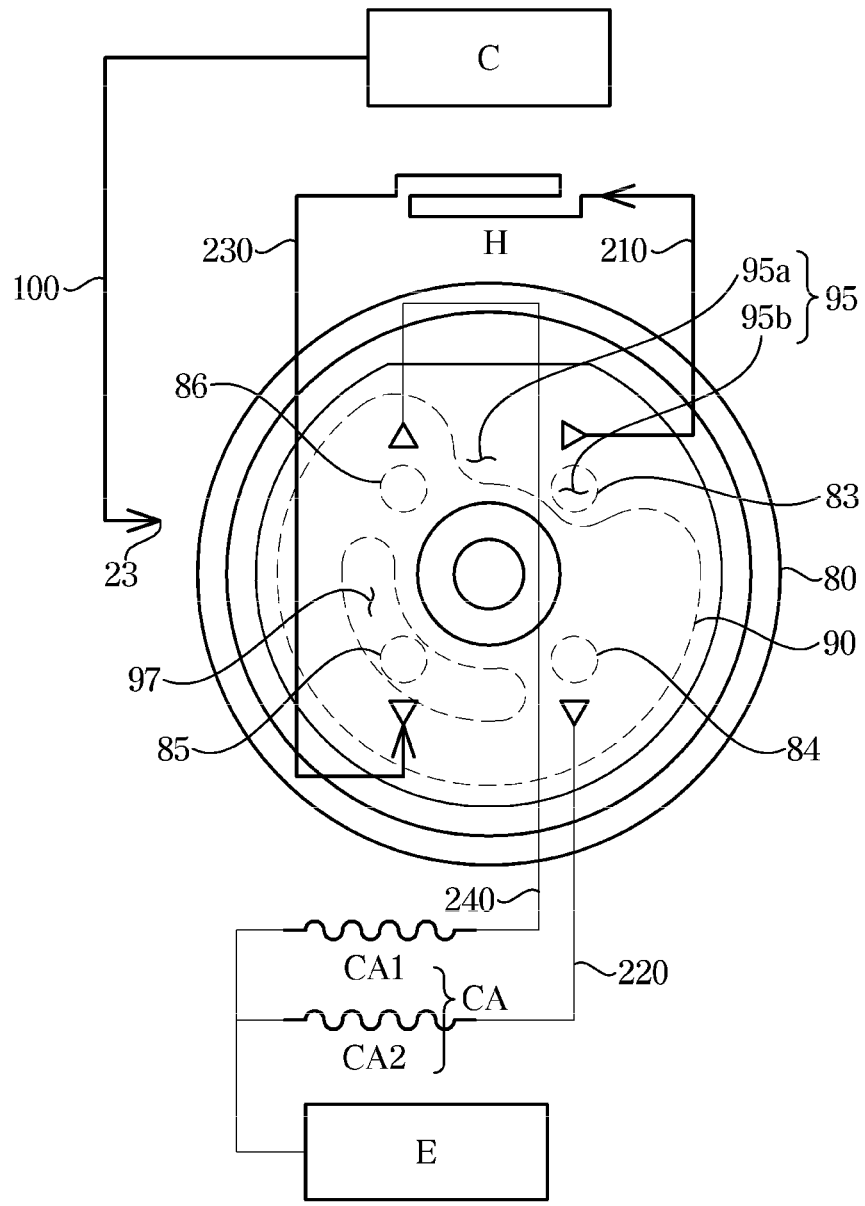
FIG. 8 is a view illustrating a state in which among a plurality of refrigerant inlet and outlet holes, a first refrigerant inlet and outlet hole is opened and remaining refrigerant inlet and outlet holes are closed by the pad according to one embodiment of the present disclosure.
Figure 9:
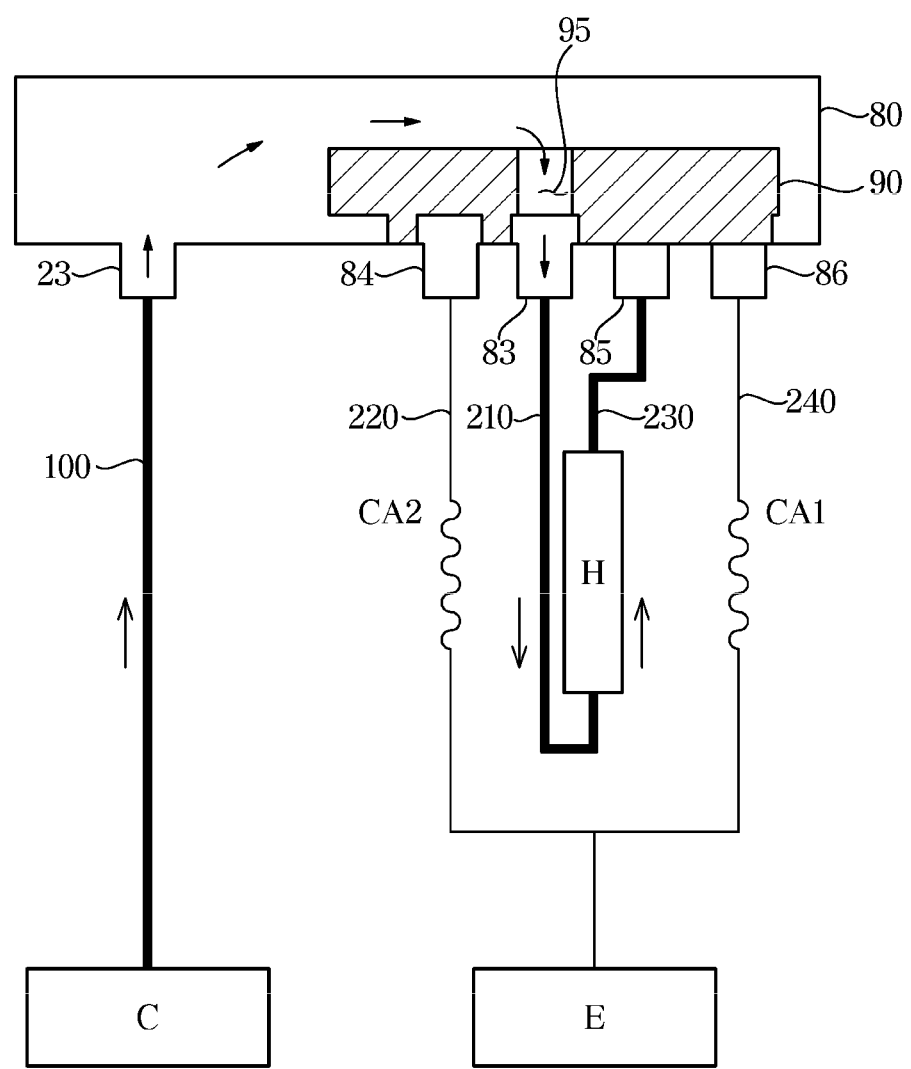
FIG. 9 is a side cross-sectional view schematically illustrating the state in which among the plurality of refrigerant inlet and outlet holes, the first refrigerant inlet and outlet hole is opened and remaining refrigerant inlet and outlet holes are closed by the pad according to one embodiment of the present disclosure.
Figure 10:
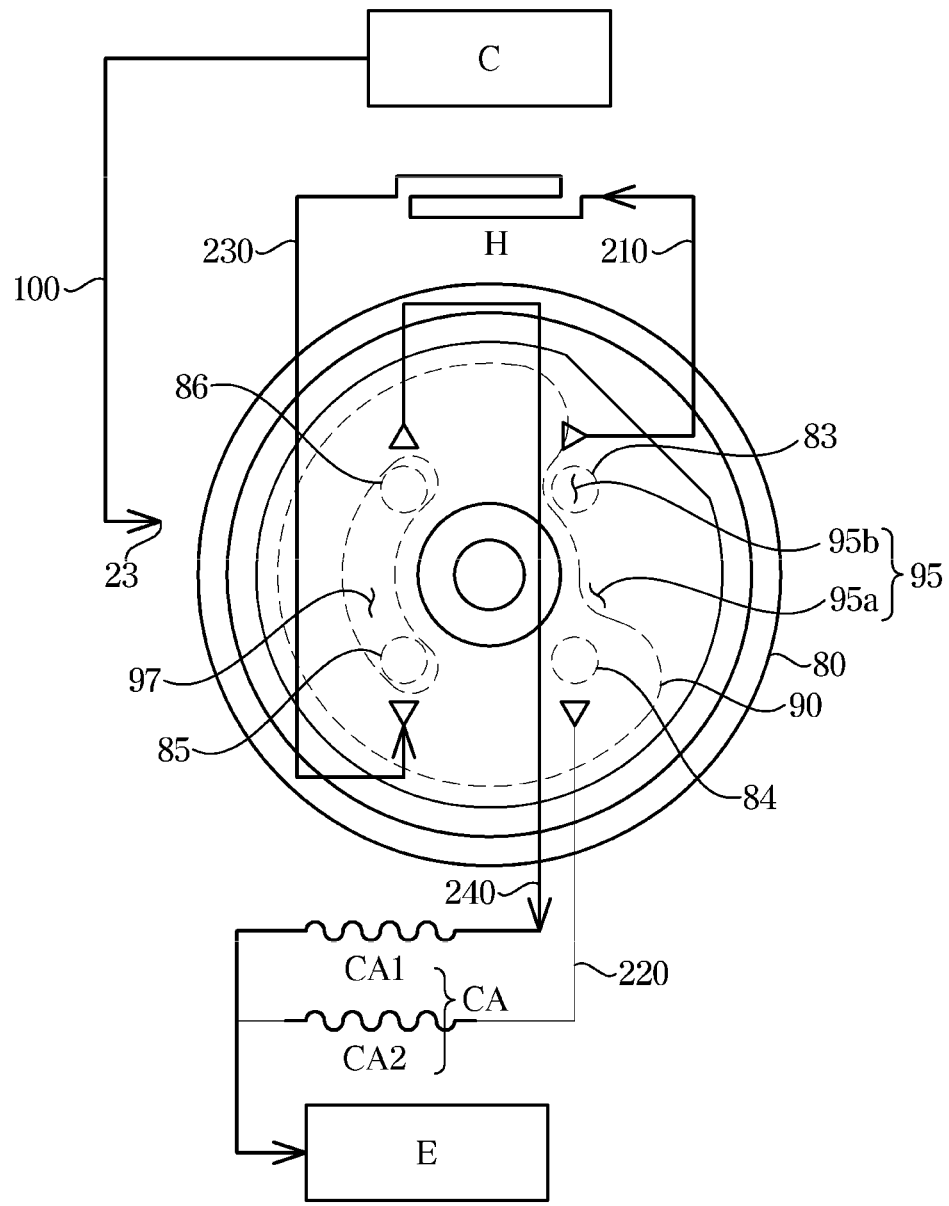
FIG. 10 is a view illustrating a state in which among the plurality of refrigerant inlet and outlet holes, the first refrigerant inlet and outlet hole is opened and a third refrigerant inlet and outlet hole is connected to a fourth refrigerant inlet and outlet hole by the pad according to one embodiment of the present disclosure.
Figure 11:
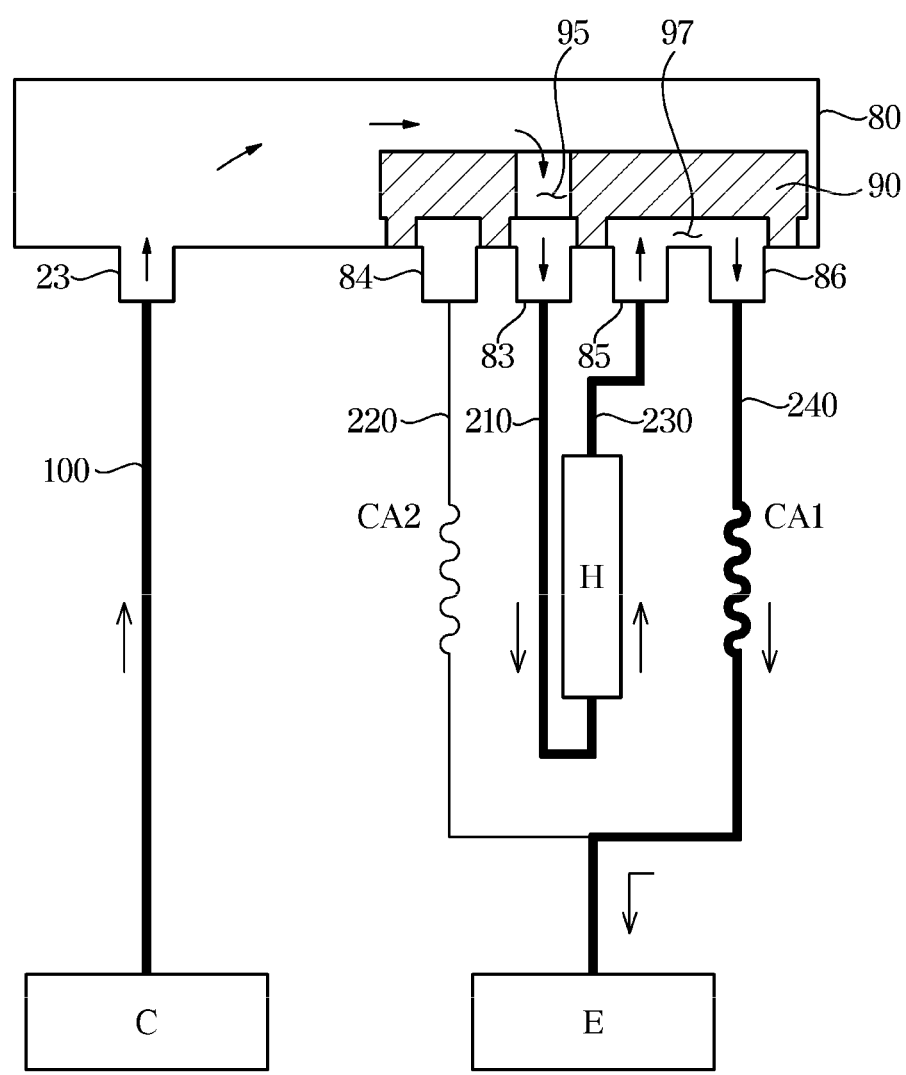
FIG. 11 is a side cross-sectional view schematically illustrating the state in which among the plurality of refrigerant inlet and outlet holes, the first refrigerant inlet and outlet hole is opened and the third refrigerant inlet and outlet hole is connected to the fourth refrigerant inlet and outlet hole by the pad according to one embodiment of the present disclosure.
Figure 12:
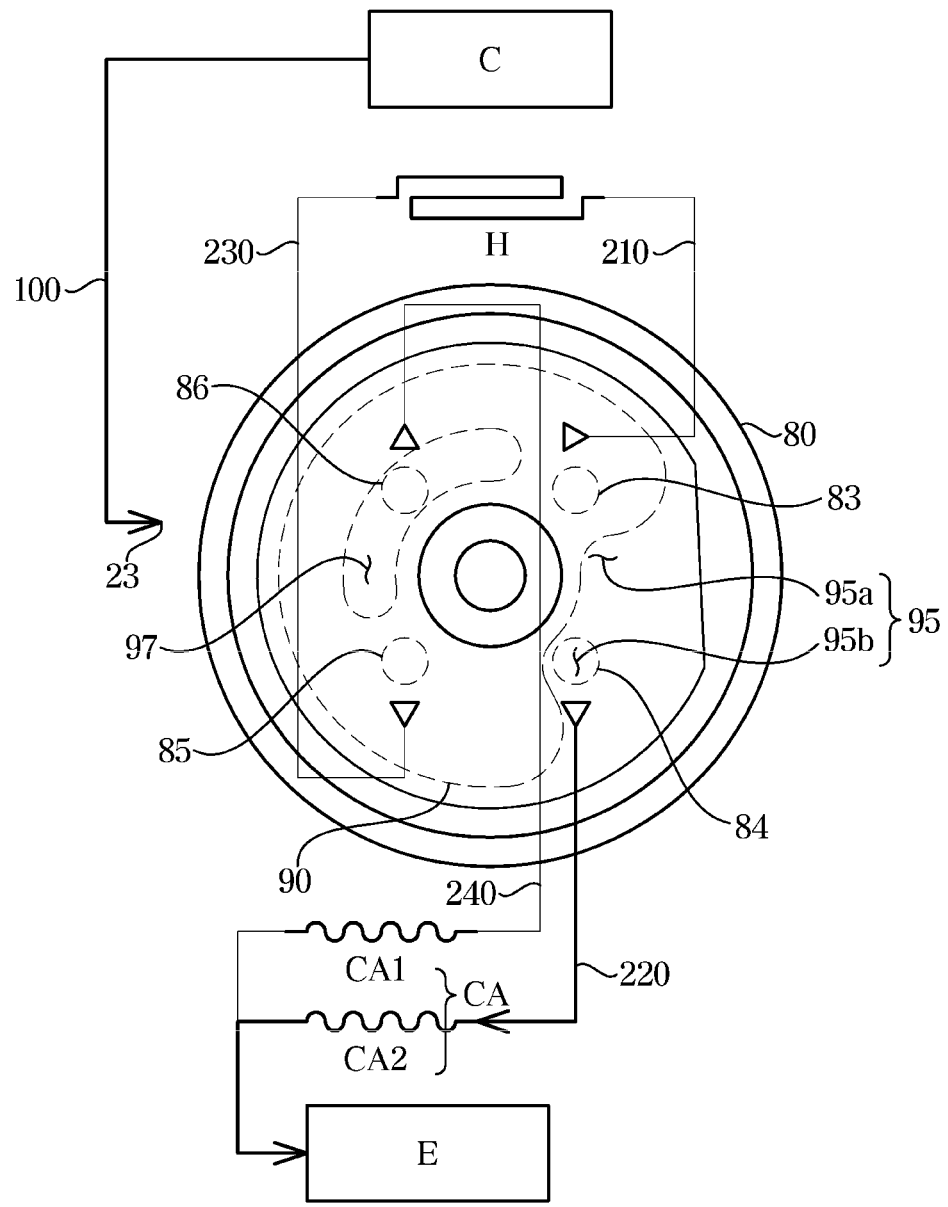
FIG. 12 is a view illustrating a state in which among the plurality of refrigerant inlet and outlet holes, a second refrigerant inlet and outlet hole is opened and the first refrigerant inlet and outlet hole and the third refrigerant inlet and outlet hole are closed by the pad according to one embodiment of the present disclosure.
Figure 13:
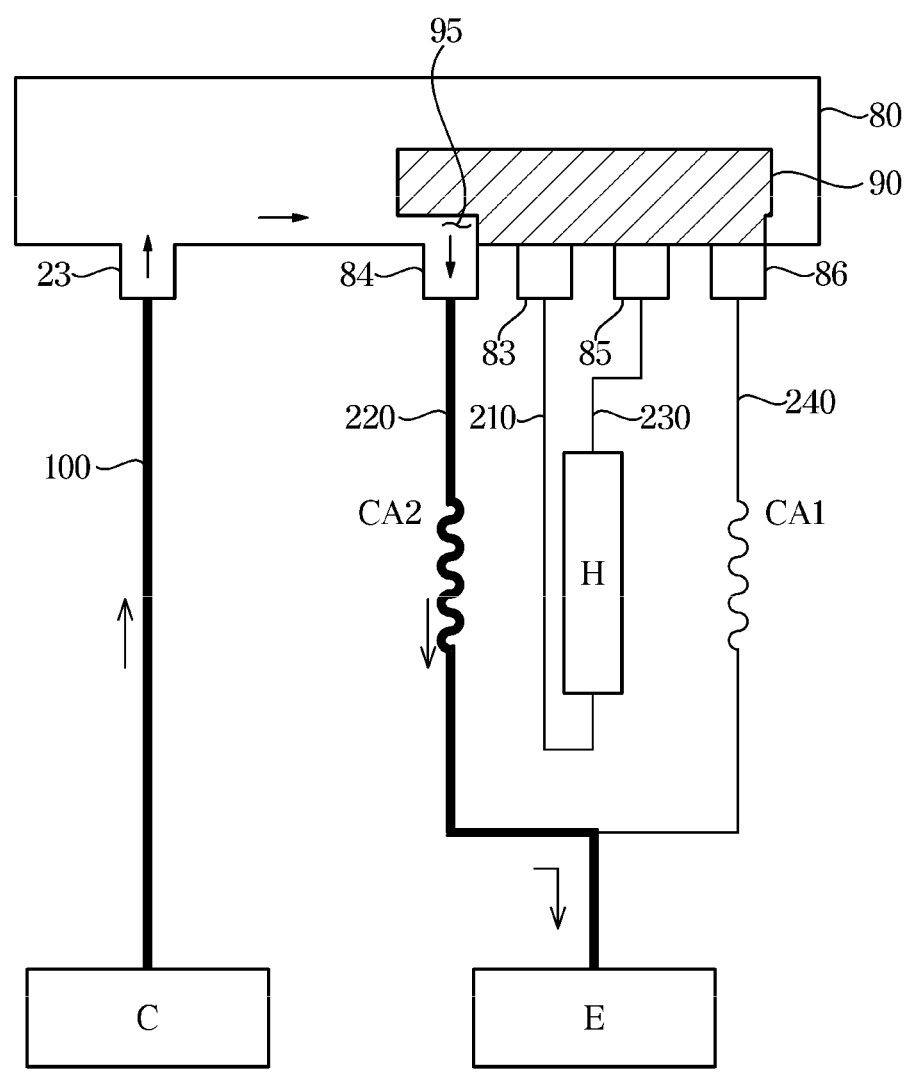
FIG. 13 is a side cross-sectional view schematically illustrating the state in which among the plurality of refrigerant inlet and outlet holes, the second refrigerant inlet and outlet hole is opened and the first refrigerant inlet and outlet hole and the third refrigerant inlet and outlet hole are closed by the pad according to one embodiment of the present disclosure.
Figure 14:
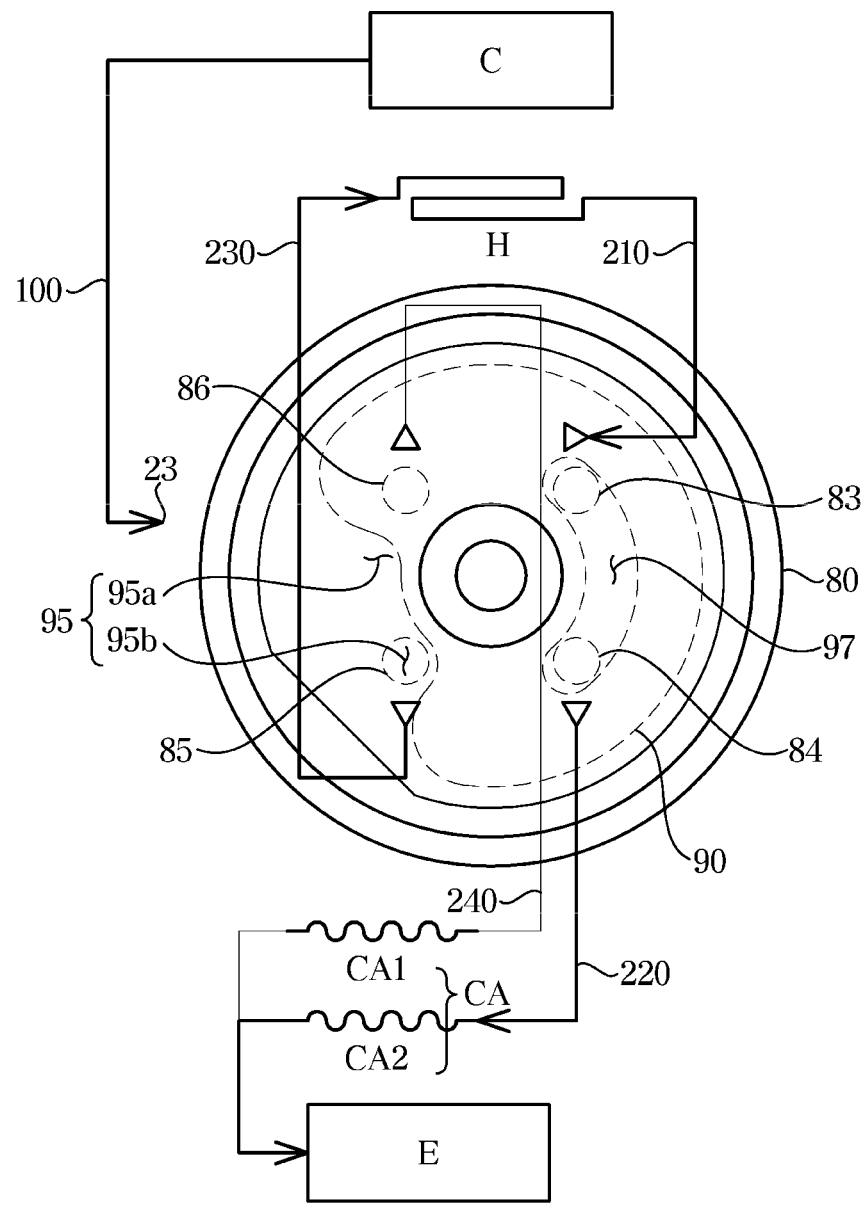
FIG. 14 is a view illustrating a state in which among the plurality of refrigerant inlet and outlet holes, the third refrigerant inlet and outlet hole is opened by the pad and the first refrigerant inlet and outlet hole is connected to the second refrigerant inlet and outlet hole by a connection cavity according to one embodiment of the present disclosure.
Figure 15:
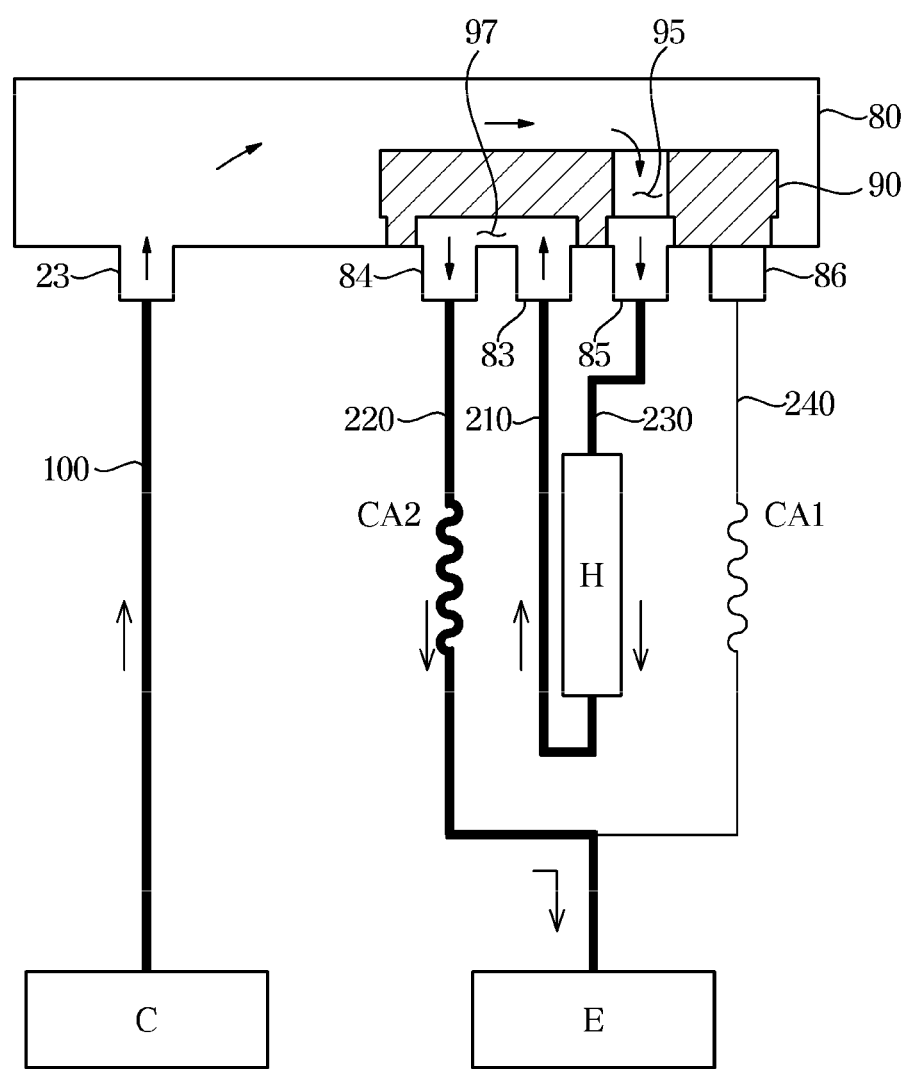
FIG. 15 is a side cross-sectional view schematically illustrating the state in which among the plurality of refrigerant inlet and outlet holes, the third refrigerant inlet and outlet hole is opened by the pad and the first refrigerant inlet and outlet hole is connected to the second refrigerant inlet and outlet hole by the connection cavity according to one embodiment of the present disclosure.
Figure 16:
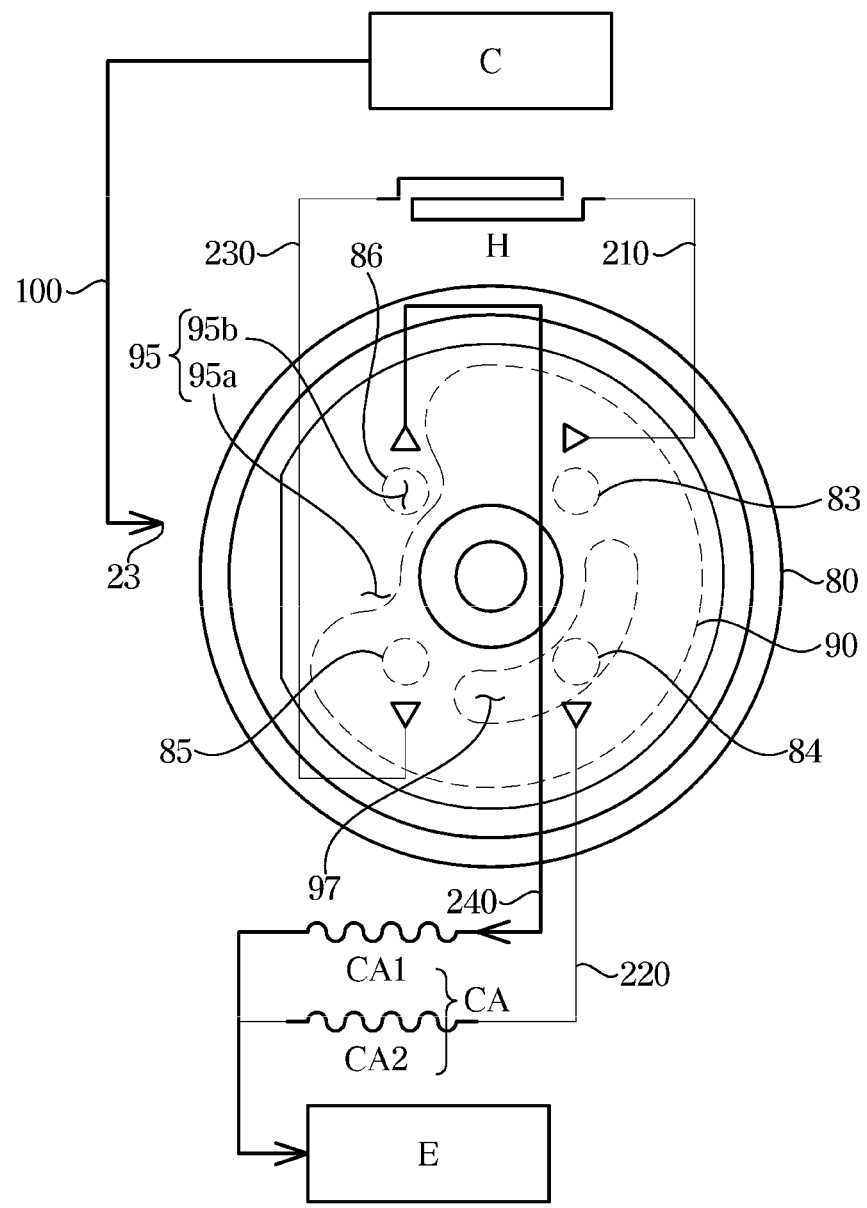
FIG. 16 is a view illustrating a state in which among the plurality of refrigerant inlet and outlet holes, the fourth refrigerant inlet and outlet hole is opened and the first refrigerant inlet and outlet hole and the third refrigerant inlet and outlet hole are closed by the pad according to one embodiment of the present disclosure.
Figure 17:
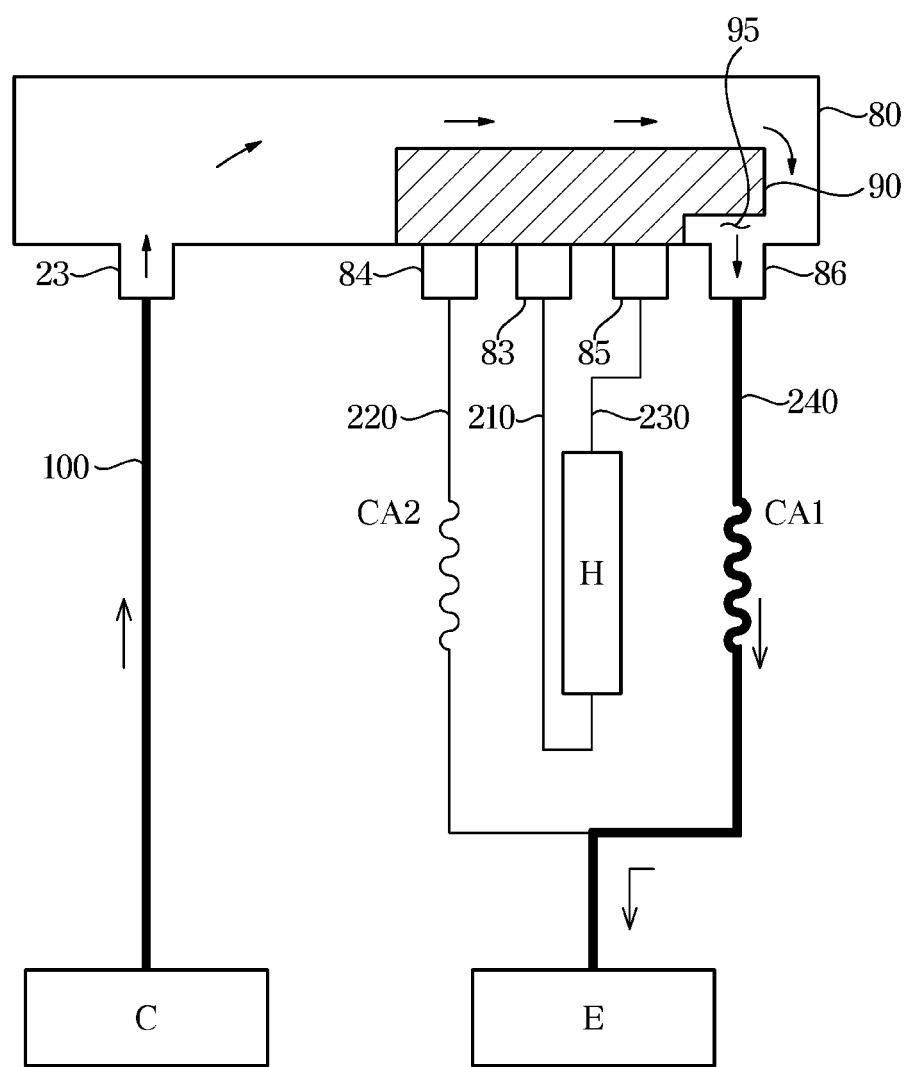
FIG. 17 is a side cross-sectional view schematically illustrating the state in which among the plurality of refrigerant inlet and outlet holes, the fourth refrigerant inlet and outlet hole is opened and the first refrigerant inlet and outlet hole and the third refrigerant inlet and outlet hole are closed by the pad according to one embodiment of the present disclosure.

FIG. 8 is a view illustrating a state in which among a plurality of refrigerant inlet and outlet holes, a first refrigerant inlet and outlet hole is opened and remaining refrigerant inlet and outlet holes are closed by the pad according to one embodiment of the present disclosure. FIG. 9 is a side cross-sectional view schematically illustrating the state in which among the plurality of refrigerant inlet and outlet holes, the first refrigerant inlet and outlet hole is opened and remaining refrigerant inlet and outlet holes are closed by the pad according to one embodiment of the present disclosure. FIG. 10 is a view illustrating a state in which among the plurality of refrigerant inlet and outlet holes, the first refrigerant inlet and outlet hole is opened and a third refrigerant inlet and outlet hole is connected to a fourth refrigerant inlet and outlet hole by the pad according to one embodiment of the present disclosure. FIG. 11 is a side cross-sectional view schematically illustrating the state in which among the plurality of refrigerant inlet and outlet holes, the first refrigerant inlet and outlet hole is opened and the third refrigerant inlet and outlet hole is connected to the fourth refrigerant inlet and outlet hole by the pad according to one embodiment of the present disclosure. FIG. 12 is a view illustrating a state in which among the plurality of refrigerant inlet and outlet holes, a second refrigerant inlet and outlet hole is opened and the first refrigerant inlet and outlet hole and the third refrigerant inlet and outlet hole are closed by the pad according to one embodiment of the present disclosure. FIG. 13 is a side cross-sectional view schematically illustrating the state in which among the plurality of refrigerant inlet and outlet holes, the second refrigerant inlet and outlet hole is opened and the first refrigerant inlet and outlet hole and the third refrigerant inlet and outlet hole are closed by the pad according to one embodiment of the present disclosure. FIG. 14 is a view illustrating a state in which among the plurality of refrigerant inlet and outlet holes, the third refrigerant inlet and outlet hole is opened by the pad and the first refrigerant inlet and outlet hole is connected to the second refrigerant inlet and outlet hole by a connection cavity according to one embodiment of the present disclosure. FIG. 15 is a side cross-sectional view schematically illustrating the state in which among the plurality of refrigerant inlet and outlet holes, the third refrigerant inlet and outlet hole is opened by the pad and the first refrigerant inlet and outlet hole is connected to the second refrigerant inlet and outlet hole by the connection cavity according to one embodiment of the present disclosure. FIG. 16 is a view illustrating a state in which among the plurality of refrigerant inlet and outlet holes, the fourth refrigerant inlet and outlet hole is opened and the first refrigerant inlet and outlet hole and the third refrigerant inlet and outlet hole are closed by the pad according to one embodiment of the present disclosure. FIG. 17 is a side cross-sectional view schematically illustrating the state in which among the plurality of refrigerant inlet and outlet holes, the fourth refrigerant inlet and outlet hole is opened and the first refrigerant inlet and outlet hole and the third refrigerant inlet and outlet hole are closed by the pad according to one embodiment of the present disclosure.

As illustrated in FIGS. 8 and 9, a refrigerant compressed in a compressor (not shown) may be transferred to the condenser C and then condensed. The refrigerant condensed in the condenser C may be transferred to the capillary tube CA, which is an expansion device, and then expanded. The refrigerant expanded in the capillary tube CA may be transferred to an evaporator E and may generate cold air through heat exchange in the evaporator E.

In a refrigerator, the refrigerant condensed in the condenser C may be transferred to the capillary tube CA, particularly, the refrigerant condensed in the condenser C may be directly transferred to the capillary tube CA or may be transferred to the capillary tube CA through a hot pipe H.

The hot pipe H is a pipe installed to prevent formation of dew on a gasket portion of a refrigerator door, which is a temperature-vulnerable portion of the refrigerator. That is, a high-temperature refrigerant in a high-pressure portion of the refrigeration cycle passes through the hot pipe H to prevent formation of dew on the gasket portion of the refrigerator door.

The hot pipe H only needs to maintain a temperature greater than or equal to a dew point according to humidity of the outside air, but when the temperature is maintained to be greater than or equal to the dew point in the refrigerator, it acts as a heat load inside the refrigerator, thereby increasing the power consumption of the refrigerator. Accordingly, according to operation conditions, the refrigerant condensed in the condenser C may be transferred to the capillary tube CA through the hot pipe H or may be directly transferred to the capillary tube CA without passing through the hot pipe H. For this, a valve device may be installed an outlet pipe through which the refrigerant condensed in the condenser C is discharged.

Basically, in response to turning on the compressor, the hot pipe H may be bypassed, and thus the refrigerant condensed in the condenser C may be directly transferred to the capillary tube CA without passing through the hot pipe H. In response to a predetermined period of time elapsing after the compressor is turned on, the refrigerant condensed in the condenser C may be transferred to the capillary tube CA through the hot pipe H. When the refrigerant condensed in the condenser C is transferred to the capillary tube CA through the hot pipe H, a time, in which the refrigerant passes through the hot pipe H, may be operated at once or operated by dividing the number of times.

The capillary tube CA may include a first capillary tube CA1 and a second capillary tube CA2. The first capillary tube CA1 and the second capillary tube CA2 may have different inner diameters and different lengths. The first capillary tube CA1 may have a large inner diameter and a short length. That is, when the cooling load is high, the refrigerant may be introduced into the first capillary tube CA1 having a low refrigerant flow resistance and then expanded. The second capillary tube CA2 may have a smaller inner diameter and a longer length than that of the first capillary tube CA1. That is, when the cooling load is low, the refrigerant may be introduced into the second capillary tube CA2 having a high refrigerant flow resistance and then expanded.

When the capillary tube CA is composed of a single capillary tube, it may be difficult to satisfy all the cooling loads of various region, and thus it may be difficult to efficiently perform the operation. That is, in a region in which the cooling load is quite high, it is difficult for the capillary tube CA to transmit the refrigerant as much as a flow rate of the compressor. Accordingly, a refrigerant shortage may occur, and thus it may be difficult to efficiently perform the operation. In addition, in a region in which the cooling load is low, the capillary tube CA may transmit the refrigerant, which is greater than the flow rate of the compressor. Accordingly, refrigerant excess may occur and thus it may be difficult to efficiently perform the operation.

The cooling load may vary according to the outside temperature, set temperature, input load, and the like. That is, when the outside air temperature is equal to or higher than a predetermined temperature, the cooling load may be high. In addition, when a temperature of a storage compartment is greater than or equal to a set temperature, the cooling load may be high. In addition, when an opening time of a door for opening and closing the storage compartment is greater than or equal to a predetermined time or when the number of times of opening the door is greater than or equal to a predetermined number of times, the cooling load may be high. Further, when a temperature drop speed of the storage compartment is less than or equal to a set speed due to the load increase inside the refrigerator, the cooling load may be high.

As described above, when the cooling load is high, the refrigerant condensed in the condenser C may be transferred to the first capillary tube CA1 having a relatively low refrigerant flow resistance and expanded. That is, because the refrigerant shortage occurs when the cooling load is high, the refrigerant may be transferred to the first capillary tube CA1 having a relatively low flow resistance, thereby preventing the refrigerant shortage.

When the cooling load is low, the refrigerant condensed in the condenser C may be transferred to the second capillary tube CA2 having a relatively high refrigerant flow resistance and expanded. That is, because the refrigerant excess occurs when the cooling load is low, the refrigerant may be transferred to the second capillary tube CA2 having a relatively high flow resistance, thereby preventing the refrigerant excess.

That is, by controlling the valve device to allow the refrigerant to be introduced into the first capillary tube CA1 or the second capillary tube CA2 according to the cooling load, it is possible to efficiently perform the operation in a wider cooling load region.

The inlet pipe 100 may be connected to an outlet pipe of the condenser C. The inlet pipe 100 may be connected to the accommodation space 11 inside the case 10 through the refrigerant inlet hole 23 (refer to FIGS. 2 and 7).

The plurality of refrigerant inlet and outlet holes 82 may include a first refrigerant inlet and outlet hole 83, a second refrigerant inlet and outlet hole 84 provided at a position rotated 90 degrees clockwise from the first refrigerant inlet and outlet hole 83 with respect to the center of the boss 80, a third refrigerant inlet and outlet hole 85 provided at a position rotated 90 degrees clockwise from the second refrigerant inlet and outlet hole 84 with respect to the center of the boss 80, and a fourth refrigerant inlet and outlet hole 86 provided at a position rotated 90 degrees clockwise from the third refrigerant inlet and outlet hole 85 with respect to the center of the boss 80.

The plurality of inlet and outlet pipes 200 may include a first inlet and outlet pipe 210 connected to the first refrigerant inlet and outlet hole 83, a second inlet and outlet pipe 220 connected to the second refrigerant inlet and outlet hole 84, a third inlet and outlet pipe 230 connected to the third refrigerant inlet and outlet hole 85, and a fourth inlet and outlet pipe 240 connected to the fourth refrigerant inlet and outlet hole 86.

The first inlet and outlet pipe 210 and the third inlet and outlet pipe 230 may be connected to the hot pipe H. A refrigerant may be introduced into the first inlet and outlet pipe 210 and discharged to the third inlet and outlet pipe 230 through the hot pipe H. In addition, the refrigerant may be introduced into the third inlet and outlet pipe 230 and discharged to the first inlet and outlet pipe 210 through the hot pipe H. The fourth inlet and outlet pipe 240 may be connected to the first capillary tube CA1. The second inlet and outlet pipe 220 may be connected to the second capillary tube CA2.

In response to the second region 95b of the open cavity 95 of the pad 90 being located in the first refrigerant inlet and outlet hole 83, only the first refrigerant inlet and outlet hole 83 may be opened by the open cavity 95. The remaining refrigerant inlet and outlet holes 84, 85, and 86 except for the first refrigerant inlet and outlet hole 83 may be closed by the pad 90. Accordingly, the refrigerant introduced into the accommodation space 11 through the inlet pipe 100 may be discharged to the first inlet and outlet pipe 210 through the first refrigerant inlet and outlet hole 83 and then introduced into the hot pipe. However, because the refrigerant inlet and outlet holes 84, 85, and 86 except for the first refrigerant inlet and outlet hole 83 are closed by the pad 90, the valve device may be in a closed state in which the refrigerant no longer flows.

As illustrated in FIGS. 10 and 11, the refrigerant condensed in the condenser C may be transferred to the first capillary tube CA1 through the hot pipe H, and then expanded. The refrigerant expanded in the first capillary tube CA1 may be transferred to the evaporator E and may generate cold air through heat exchange in the evaporator E.

In response to the pad 90, which is in the closed state, being rotated 45 degrees clockwise with respect to the center of the boss 80, the first region 95a of the open cavity 95 may be located in the first refrigerant inlet and outlet hole 83. In response to the first region 95a being located in the first refrigerant inlet and outlet hole 83, the first refrigerant inlet and outlet hole 83 may be opened by the open cavity 95. The second refrigerant inlet and outlet hole 84 may be closed by the pad 90. The third refrigerant inlet and outlet hole 85 and the fourth refrigerant inlet and outlet hole 86 may be connected by the connection cavity 97.

The refrigerant introduced into the inlet pipe 100 from the condenser C may be introduced into the accommodation space 11 (refer to FIGS. 2 and 7) through the refrigerant inlet hole 23. The introduced refrigerant may be discharged to the first inlet and outlet pipe 210 through the first refrigerant inlet and outlet hole 83 opened by the open cavity 95 of the pad 90. The refrigerant discharged to the first inlet and outlet pipe 210 may be introduced into the third inlet and outlet pipe 230 through the hot pipe H. The refrigerant introduced into the third inlet and outlet pipe 230 may be discharged to the fourth inlet and outlet pipe 240 through the fourth refrigerant inlet and outlet hole 86 connected to the third refrigerant inlet and outlet hole 85 by the connection cavity 97. The refrigerant discharged to the fourth inlet and outlet pipe 240 may be introduced into the first capillary tube CA1. The refrigerant introduced into the first capillary tube CA1 and expanded may be transferred to the evaporator E and generate cold air through heat exchange in the evaporator E. On the drawings, it is illustrated that a single evaporator E is connected to the first capillary tube CA1 and the second capillary tube CA2, but is not limited thereto. That is, two evaporators E may be provided. When two evaporators E are provided, the first capillary tube CA1 and the second capillary tube CA2 may be connected to the different evaporator E, respectively.

As illustrated in FIGS. 12 and 13, the refrigerant condensed in the condenser C may be introduced into the second capillary tube CA2 and then expanded without passing through the hot pipe H. The refrigerant expanded in the second capillary tube CA2 may be transferred to the evaporator E and may generate cold air through heat exchange in the evaporator E.

In response to the pad 90, which is in the closed state, being rotated 90 degrees clockwise with respect to the center of the boss 80, the second region 95b of the open cavity 95 may be located in the second refrigerant inlet and outlet hole 84. In response to the second region 95b being located in the second refrigerant inlet and outlet hole 84, the second refrigerant inlet and outlet hole 84 may be opened by the open cavity 95. The first refrigerant inlet and outlet hole 83 and the third refrigerant inlet and outlet hole 85 may be closed by the pad 90.

The refrigerant introduced into the inlet pipe 100 from the condenser C may be introduced into the accommodation space 11 (refer to FIGS. 2 and 7) through the refrigerant inlet hole 23. The introduced refrigerant may be discharged to the second inlet and outlet pipe 220 through the second refrigerant inlet and outlet hole 84 opened by the open cavity 95 of the pad 90. The refrigerant discharged to the second inlet and outlet pipe 220 may be introduced into the second capillary tube CA2. The refrigerant introduced into the second capillary tube CA2 and expanded may be transferred to the evaporator E and may generate cold air through heat exchange in the evaporator E. On the drawings, it is illustrated that a single evaporator E is connected to the first capillary tube CA1 and the second capillary tube CA2, but is not limited thereto. That is, two evaporators E may be provided. When two evaporators E are provided, the first capillary tube CA1 and the second capillary tube CA2 may be connected to the different evaporator E, respectively. In this case, because the first refrigerant inlet and outlet hole 83 and the third refrigerant inlet and outlet hole 85 are closed, the refrigerant may be blocked from being discharged to the first inlet and outlet pipe 210 and the third inlet and outlet pipe 230.

As illustrated in FIGS. 14 and 15, the refrigerant condensed in the condenser C may be transferred to the second capillary tube CA2 by passing through the hot pipe H, and then expanded. The refrigerant expanded in the second capillary tube CA2 may be transferred to the evaporator E and may generate cold air through heat exchange in the evaporator E.

In response to the pad 90, which is in the closed state, being rotated 225 degrees clockwise with respect to the center of the boss 80, the first region 95a of the open cavity 95 may be located in the third refrigerant inlet and outlet hole 85. In response to the first region 95a being located in the third refrigerant inlet and outlet hole 85, the third refrigerant inlet and outlet hole 85 may be opened by the open cavity 95. The fourth refrigerant inlet and outlet hole 86 may be closed by the pad 90. The first refrigerant inlet and outlet hole 83 and the second refrigerant inlet and outlet hole 84 may be connected by the connection cavity 97.

The refrigerant introduced into the inlet pipe 100 from the condenser C may be introduced into the accommodation space 11 (refer to FIGS. 2 and 7) through the refrigerant inlet hole 23. The introduced refrigerant may be discharged to the third inlet and outlet pipe 230 through the third refrigerant inlet and outlet hole 85 opened by the open cavity 95 of the pad 90. The refrigerant discharged to the third inlet and outlet pipe 230 may be introduced into the first inlet and outlet pipe 210 through the hot pipe H. The refrigerant introduced into the first inlet and outlet pipe 210 may be discharged to the second inlet and outlet pipe 220 through the second refrigerant inlet and outlet hole 84 connected to the first refrigerant inlet and outlet hole 83 by the connection cavity 97. The refrigerant discharged into the second inlet and outlet pipe 220 may be introduced into the second capillary tube CA2. The refrigerant introduced into the second capillary tube CA2 and expanded may be transferred to the evaporator E and may generate cold air through heat exchange in the evaporator E. On the drawings, it is illustrated that a single evaporator E is connected to the first capillary tube CA1 and the second capillary tube CA2, but is not limited thereto. That is, two evaporators E may be provided. When two evaporators E are provided, the first capillary tube CA1 and the second capillary tube CA2 may be connected to the different evaporator E, respectively.

As illustrated in FIGS. 16 and 17, the refrigerant condensed in the condenser C may be introduced into the first capillary tube CA1 and then expanded without passing through the hot pipe H. The refrigerant expanded in the first capillary tube CA1 may be transferred to the evaporator E and may generate cold air through heat exchange in the evaporator E.

In response to the pad 90, which is in the closed state, being rotated 270 degrees clockwise with respect to the center of the boss 80, the second region 95b of the open cavity 95 may be located in the fourth refrigerant inlet and outlet hole 86. In response to the second region 95b being located in the fourth refrigerant inlet and outlet hole 86, the fourth refrigerant inlet and outlet hole 86 may be opened by the open cavity 95. The first refrigerant inlet and outlet hole 83 and the third refrigerant inlet and outlet hole 85 may be closed by the pad 90.

The refrigerant introduced into the inlet pipe 100 from the condenser C may be introduced into the accommodation space 11 (refer to FIGS. 2 and 7) through the refrigerant inlet hole 23. The introduced refrigerant may be discharged to the fourth inlet and outlet pipe 240 through the fourth refrigerant inlet and outlet hole 86 opened by the open cavity 95 of the pad 90. The refrigerant discharged to the fourth inlet and outlet pipe 240 may be introduced into the first capillary tube CA1. The refrigerant introduced into the first capillary tube CA1 and expanded may be transferred to the evaporator E and may generate cold air through heat exchange in the evaporator E. On the drawings, it is illustrated that a single evaporator E is connected to the first capillary tube CA1 and the second capillary tube CA2, but is not limited thereto. That is, two evaporators E may be provided. When two evaporators E are provided, the first capillary tube CA1 and the second capillary tube CA2 may be connected to the different evaporator E, respectively. In this case, because the first refrigerant inlet and outlet hole 83 and the third refrigerant inlet and outlet hole 85 are closed, the refrigerant may be blocked from being discharged into the first inlet and outlet pipe 210 and the third inlet and outlet pipe 230.

While the present disclosure has been particularly described with reference to exemplary embodiments, it should be understood by those of skilled in the art that various changes in form and details may be made without departing from the spirit and scope of the present disclosure.

What is claimed is:

1. A valve device comprising:
a case comprising an open lower portion and an accommodation space formed therein;
a base plate to cover the open lower portion of the case;
an inlet pipe connected to the base plate and through which a refrigerant is introduced to the accommodation space;
a boss installed to the base plate and comprising a plurality of refrigerant inlet and outlet holes through which the introduced refrigerant from the accommodation space is introduced and discharged;
a plurality of inlet and outlet pipes respectively connected to the plurality of refrigerant inlet and outlet holes, and through which the refrigerant is introduced from the boss or discharged to the boss; and
a pad comprising an open cavity formed therein to selectively open one refrigerant inlet and outlet hole among the plurality of refrigerant inlet and outlet holes, and a connection cavity formed therein to selectively connect two refrigerant inlet and outlet holes among the plurality of refrigerant inlet and outlet holes,
wherein the open cavity comprises a first region formed on one side of the open cavity and a second region formed on an other side of the open cavity and provided at a position rotated 45 degrees clockwise from the first region with respect to a center of the pad.

2. The valve device of claim 1, wherein
the open cavity selectively opens one refrigerant inlet and outlet hole among the plurality of refrigerant inlet and outlet holes according to a rotation of the pad, and in response to the pad being rotated 45 degrees or less when the one refrigerant inlet and outlet hole is opened, the open state of the one refrigerant inlet and outlet hole is maintained.

3. The valve device of claim 1, wherein
the open cavity and the connection cavity are formed in a shape of a groove which is recessed from a bottom surface of the pad.

4. The valve device of claim 3, wherein
the open cavity extends to an edge of the pad in a radial direction of the pad, and the open cavity has a size of 75 degrees to 80 degrees with respect to the center of the pad in a circumferential direction of the pad.

5. The valve device of claim 3, wherein
the connection cavity selectively connects two refrigerant inlet and outlet holes adjacent to each other among the plurality of refrigerant inlet and outlet holes.

6. The valve device of claim 1, wherein
the plurality of refrigerant inlet and outlet holes comprises a first refrigerant inlet and outlet hole, a second refrigerant inlet and outlet hole formed at a position rotated 90 degrees clockwise from the first refrigerant inlet and outlet holes with respect to a center of the boss, a third refrigerant inlet and outlet hole formed at a position rotated 90 degrees clockwise from the second refrigerant inlet and outlet hole with respect to the center of the boss, and a fourth refrigerant inlet and outlet hole formed at a position rotated 90 degrees clockwise from the third refrigerant inlet and outlet hole with respect to the center of the boss.

7. The valve device of claim 6, wherein
the plurality of inlet and outlet pipes comprises a first inlet and outlet pipe connected to the first refrigerant inlet and outlet hole, a second inlet and outlet pipe connected to the second refrigerant inlet and outlet hole, a third inlet and outlet pipe connected to the third refrigerant inlet and outlet hole, and a fourth inlet and outlet pipe connected to the fourth refrigerant inlet and outlet hole.

8. The valve device of claim 7, wherein
the inlet pipe is connected to an outlet pipe of a condenser to receive a refrigerant from the condenser therethrough, the first inlet and outlet pipe and the third inlet and outlet pipe are connected to a hot pipe, the fourth inlet and outlet pipe is connected to a first capillary tube, and the second inlet and outlet pipe is connected to a second capillary tube.

9. The valve device of claim 8, wherein
in response to the second region of the open cavity being located in the first refrigerant inlet and outlet hole, the valve device is in a closed state so that only the first refrigerant inlet and outlet hole is opened by the open cavity while the second refrigerant inlet and outlet hole, the third refrigerant inlet and outlet hole, and the fourth refrigerant inlet and outlet hole are closed, and the refrigerant from the accommodation space is discharged to the first inlet and outlet pipe through the first refrigerant inlet and outlet hole and then introduced into the hot pipe.

10. The valve device of claim 9, wherein
in response to the first region of the open cavity being located in the first refrigerant inlet and outlet hole as the pad is rotated 45 degrees clockwise with respect to the center of the boss, the first refrigerant inlet and outlet hole is opened, the second refrigerant inlet and outlet hole is closed, and the third refrigerant inlet and outlet hole and the fourth refrigerant inlet and outlet hole are connected by the connection cavity.

11. The valve device of claim 10, wherein
the refrigerant from the accommodation space is discharged to the first inlet and outlet pipe through the first refrigerant inlet and outlet hole, introduced into the third inlet and outlet pipe through the hot pipe, discharged to the fourth inlet and outlet pipe through the fourth refrigerant inlet and outlet hole connected to the third refrigerant inlet and outlet hole by the connection cavity, and then introduced into the first capillary tube.

12. The valve device of claim 9, wherein
in response to the second region of the open cavity being located in the second refrigerant inlet and outlet hole as the pad is rotated 90 degrees clockwise with respect to the center of the boss, the second refrigerant inlet and outlet hole is opened, and the refrigerant from the accommodation space is discharged to the second inlet and outlet pipe through the second refrigerant inlet and outlet hole, and introduced into the second capillary tube, and the first refrigerant inlet and outlet hole and the third refrigerant inlet and outlet hole are closed to prevent the refrigerant being discharged to the first inlet and outlet pipe and the third inlet and outlet pipe.

13. The valve device of claim 9, wherein
in response to the first region of the open cavity being located in the third refrigerant inlet and outlet hole as the pad is rotated 225 degrees clockwise with respect to the center of the boss, the third refrigerant inlet and outlet hole is opened, the fourth refrigerant inlet and outlet hole is closed, and the first refrigerant inlet and outlet hole and the second refrigerant inlet and outlet hole are connected by the connection cavity.

14. The valve device of claim 13, wherein
the refrigerant from the accommodation space is discharged to the third inlet and outlet pipe through the third refrigerant inlet and outlet hole, introduced into the first inlet and outlet pipe through the hot pipe, and discharged to the second inlet and outlet pipe through the second refrigerant inlet and outlet hole connected to the first refrigerant inlet and outlet hole by the connection cavity, and then introduced into the second capillary tube.

15. The valve device of claim 9, wherein
in response to the second region of the open cavity being located in the fourth refrigerant inlet and outlet hole as the pad is rotated 270 degrees clockwise with respect to the center of the boss, the fourth refrigerant inlet and outlet hole is opened, and the refrigerant from the accommodation space is discharged to the fourth inlet and outlet pipe through the fourth refrigerant inlet and outlet hole, and introduced into the first capillary tube, and the first refrigerant inlet and outlet hole and the third refrigerant inlet and outlet hole are closed to prevent the refrigerant from being discharged to the first inlet and outlet pipe and the third inlet and outlet pipe.

16. A valve device comprising:
a main body having an open bottom portion and an accommodation space formed therein;
a base plate to cover the open bottom portion;
an inlet pipe connected to the base plate and through which a refrigerant is introduced into the accommodation space;
a boss installed to the base plate and comprising a plurality of holes;
a plurality of pipes respectively connected to the plurality of holes; and
a pad provided inside of the main body and to rotate with respect to the boss to selectively open or close the plurality of holes to control a flow of the refrigerant from the accommodation space to the plurality of pipes;
wherein the pad has a first recessed portion recessed from a bottom surface of the pad and from an outer surface of the pad thereby forming an open cavity, and a second recessed portion recessed from the bottom surface of the pad thereby forming a connection cavity to connect two of the plurality of holes to communicate each other.

17. The valve device of claim 16, wherein the first recessed portion includes a first area and a second area, and one of the first area and the second area is to be aligned with one of the plurality of holes to selectively open the aligned one of the plurality of holes while selectively closing other plurality of hole or connecting two of other plurality of holes via the connection cavity.

18. The valve device of claim 17, wherein in response to the two of other plurality of holes are connected via the connection cavity, the refrigerant from the accommodation space flows through the aligned hole, a hot pipe, the connection cavity, and one of a first capillary tube or a second capillary tube.

19. The valve device of claim 18, wherein in response to the two of other plurality of holes are connected via the connection cavity, the refrigerant from the accommodation space flows through the aligned hole and one of the first or second capillary tube by bypassing the hot pipe.

* * * * *